United States Patent
Ryntz et al.

(10) Patent No.: US 10,307,983 B2
(45) Date of Patent: Jun. 4, 2019

(54) FOAM ADHESION PROMOTION

(71) Applicants: KRATON POLYMERS U.S. LLC, Houston, TX (US); INTERNATIONAL AUTOMOTIVE COMPONENTS GROUP NORTH AMERICA, INC., Southfield, MI (US)

(72) Inventors: Rose A. Ryntz, Southfield, MI (US); William J. Tansey, Southfield, MI (US); Matt Starling, Southfield, MI (US); Giachiano Bedogne, Southfield, MI (US); Freddy Vervoort, Brussels (BE)

(73) Assignees: Kraton Polymers U.S. LLC, Houston, TX (US); International Automotive Components Group North America, Inc., Southfield, MI (US)

(*) Notice: Subject to any disclaimer, the term of this patent is extended or adjusted under 35 U.S.C. 154(b) by 88 days.

(21) Appl. No.: 15/590,727

(22) Filed: May 9, 2017

(65) Prior Publication Data
US 2017/0320288 A1 Nov. 9, 2017

Related U.S. Application Data

(60) Provisional application No. 62/333,657, filed on May 9, 2016, provisional application No. 62/334,044, filed on May 10, 2016, provisional application No. 62/466,715, filed on Mar. 3, 2017.

(51) Int. Cl.
| | |
|---|---|
| C08G 18/48 | (2006.01) |
| B32B 5/18 | (2006.01) |
| C08J 5/12 | (2006.01) |
| C09J 175/04 | (2006.01) |
| C08G 18/42 | (2006.01) |
| C09J 5/02 | (2006.01) |
| C08G 101/00 | (2006.01) |

(52) U.S. Cl.
CPC ............. *B32B 5/18* (2013.01); *C08G 18/42* (2013.01); *C08G 18/48* (2013.01); *C08J 5/124* (2013.01); *C09J 5/02* (2013.01); *C09J 175/04* (2013.01); *C08G 2101/00* (2013.01); *C08G 2101/0066* (2013.01); *C08G 2140/00* (2013.01); *C09J 2400/243* (2013.01); *C09J 2421/006* (2013.01); *C09J 2421/008* (2013.01)

(58) Field of Classification Search
CPC .......... B32B 5/18; C08G 18/42; C08G 18/48; C08G 2101/00; C08G 2101/0066; C08G 2140/00; C08J 5/124; C08J 5/02; C08J 175/04; C08J 2400/243; C08J 2421/006; C08J 2421/008
See application file for complete search history.

(56) References Cited

U.S. PATENT DOCUMENTS

| | | | |
|---|---|---|---|
| 3,670,054 A | 6/1972 | De La Mare et al. | |
| 3,700,633 A | 10/1972 | Wald et al. | |
| 5,045,231 A | 9/1991 | Braun et al. | |
| 5,362,572 A | 11/1994 | Hamada et al. | |
| 7,169,848 B2 | 1/2007 | Bening et al. | |
| 2005/0261427 A1* | 11/2005 | Saito | B32B 5/18 525/88 |
| 2008/0182074 A1 | 7/2008 | Pasquale et al. | |
| 2008/0233376 A1* | 9/2008 | Weaver | B32B 5/18 428/219 |
| 2009/0294796 A1 | 12/2009 | Morita et al. | |
| 2010/0221553 A1 | 9/2010 | Linemann et al. | |
| 2010/0323182 A1* | 12/2010 | Hashiba | B32B 5/18 428/297.4 |
| 2012/0070665 A1 | 3/2012 | Bellomo et al. | |
| 2015/0197046 A1* | 7/2015 | Yizze | B29C 45/73 428/522 |
| 2018/0264777 A1* | 9/2018 | Redmond | B32B 27/14 |

OTHER PUBLICATIONS

PubChem. SCHEMBL3374822. CID-14455175. Create date Feb. 9, 2007.

* cited by examiner

Primary Examiner — John M Cooney

(57) ABSTRACT

Methods for forming a TPE-skinned composite include forming a skin layer having at least one surface and having a thermoplastic elastomer and an adhesive promoting agent; providing a foam layer; and forming the foam layer onto the said surface of the skin layer to form the TPE-skinned composite. Optional additives such as an organo-silane compound may be added to further improve the adhesion between the skin layer and the foam. The present disclosure also provides a TPE-skinned composite including a skin layer having a thermoplastic elastomer present in an amount of greater than 90 wt. %; and an adhesive promoting agent present in an amount of from 0.5 wt. % to 10 wt. % based upon the total weight of the skin layer.

20 Claims, 1 Drawing Sheet

FOAM ADHESION PROMOTION

CROSS-REFERENCE TO RELATED APPLICATIONS

This application claims the benefit of priority to U.S. Provisional Patent Application No. 62/333,657 filed May 9, 2016; U.S. Provisional Patent Application No. 62/334,044 filed May 10, 2016; and U.S. Provisional Patent Application No. 62/466,715 filed Mar. 3, 2017, the contents of which are fully incorporated herein by reference.

TECHNICAL FIELD

The present disclosure relates to the field of chemistry. In particular, the present disclosure relates to the field of skin materials and improvements in the adhesion of foam to skin materials.

BACKGROUND

Vehicular interior trim parts are typically manufactured with an exterior decorative skin layer that is backed with a layer of foam, and in particular, polyurethane type foam. The skin material may be a thermoplastic elastomer (TPE) type material. The bond between the foam layer and the skin layer may be capable of enduring environmental temperature extremes, including large changes in temperature over a relatively short period of time.

There are two modes of failure of the bond between the skin layer and the underlying foam: (1) adhesive failure which occurs when there is a separation of the skin layer from the underlying foam; and (2) cohesive failure which occurs when the failure of the foam is observed. As the skin layer is removed, a residue of the foam on the skin layer may remain, indicative of the failure of the foam. As vehicle lifetimes extend over numerous years, there remains a growing need to improve the bonding between the underlying foam layer and the skin layer.

SUMMARY

Disclosed herein is a method for forming a TPE-skinned composite comprising the steps of:
  a) forming a skin layer having at least one surface comprising:
    (i) a thermoplastic elastomer; and
    (ii) an adhesive promoting agent;
  b) providing a foam layer; and
  c) forming the foam layer onto the said surface of the skin layer to form the TPE-skinned composite.

The present disclosure further provides a TPE-skinned composite comprising a skin layer comprising:
  (a) a thermoplastic elastomer present in an amount of greater than or equal to 90 wt. %; and
  (b) an adhesive promoting agent present in an amount of from 0.5 wt. % to 10 wt. % based upon the total weight of the skin layer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

Figure 1:
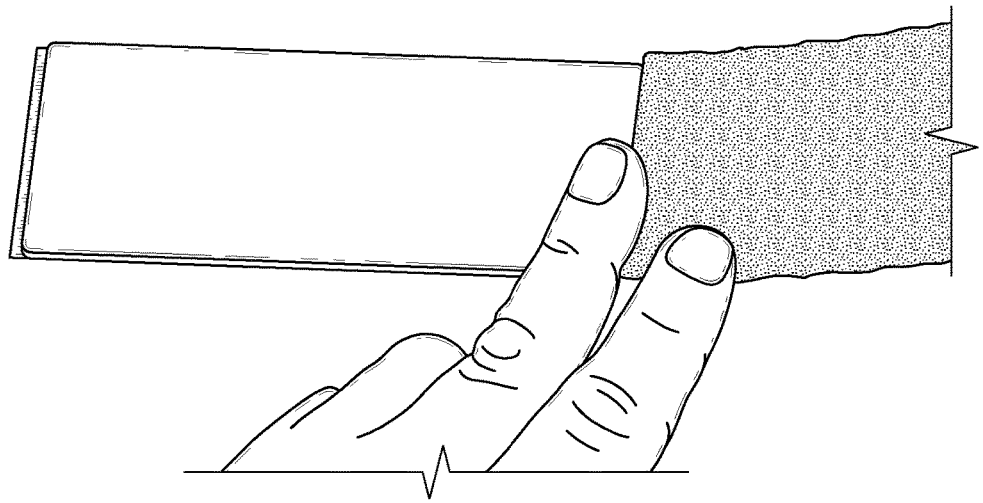
FIG. 1 shows an example of cohesive type failure.

The present invention now will be described more fully hereinafter. However, this invention may be embodied in many different forms and should not be construed as limited to the embodiments set forth herein; rather, these embodiments are provided so that this disclosure will satisfy applicable legal requirements. As such, it will be apparent to those skilled in the art that the embodiments may incorporate changes and modifications without departing from the general scope of this invention. It is intended to include all such modifications and alterations in so far as they come within the scope of the appended claims or the equivalents thereof.

As used in this specification and the claims, the singular forms "a," "an," and "the" include plural referents unless the context clearly dictates otherwise.

Moreover, it is also to be understood that the lettering of process steps or ingredients is a convenient means for identifying discrete activities or ingredients and the recited lettering can be arranged in any sequence, unless expressly indicated.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Groups of elements of the table are indicated using the numbering scheme indicated in the version of the periodic table of elements published in Chemical and Engineering News, 63(5), 27, 1985. In some instances a group of elements may be indicated using a common name assigned to the group. For any particular compound disclosed herein, the general structure or name presented is also intended to encompass all structural isomers, conformational isomers, and stereoisomers that may arise from a particular set of substituents, unless indicated otherwise. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regio-isomers, and stereoisomers that may arise from a particular set of substituents. Within this disclosure the normal rules of organic nomenclature will prevail. A chemical "group" is described according to how that group is formally derived from a reference or "parent"

compound, for example, by the number of hydrogen atoms formally removed from the parent compound to generate the group.

The term "hydrocarbon" whenever used in this specification and claims refers to a compound containing only carbon and hydrogen.

The expression "polymer" as used herein refers to polymer chain which is formed by, and corresponds to, the indicated monomer.

Unless specifically stated otherwise, the expression "percentage by weight", or alternatively "weight percent", as used herein refers to herein to the weight percent of a component of a composition based upon the total weight of the composition. Weight percent may be abbreviated as "wt. %."

The following abbreviations are used throughout the present disclosure:

The term "ASTM" as used herein refers to the American Section of the International Association for Testing Materials.

The term "ISO" as used herein refers to the International Organization for Standardization The following testing methods were employed as indicated in the disclosure:

ASTM D 6862 is entitled "Standard Test Method for 90 Degree Peel Resistance of Adhesives." The term "ASTM D 6862" as used herein refers to the standard test method for determining the resistance-to-peel strength of a bond between one rigid adherend and one flexible adherend when tested at an angle of approximately 90 degrees under specified conditions of preparation and testing. Typically, the resistance-to-peel strength, also referred to herein as pull force, may be measured using Instron Tensile Tester to pull a sample. This test method was published in 2011 and revised in 2016, the contents of which are incorporated herein by reference in their entirety. For the referenced ASTM standards, visit the ASTM website, www.astm.org, or contact ASTM Customer Service at service@astm.org.

The pull force was alternatively measured using the Chatillon Force Gauge. A TPE skin sample was removed from the foam by cutting a 2-inch wide strip through the TPE skin and into the foam. At the upper edge of the TPE skin, the strip was peeled by an operator ("by hand") to provide a piece of the TPE skin to which a Chatillon Force Gauge was attached. The TPE skin was then pulled at an uncontrolled rate from the foam. The removal force was measured at 1 inch increments through a 5 inch pull. The adhesion force as well as the type of adhesion/cohesion through the pull was documented.

ASTM D 1895 is entitled "Standard Test Methods for Apparent Density, Bulk Factor, and Pourability of Plastic Materials." The term "ASTM D 1895" as used herein refers to the standard test method for determining the apparent density, bulk factor, and where applicable, the pourability of plastic materials such as molding powders, from fine powders and granules to large flakes and cut fibers. This test method is equivalent to the ISO 60 Method as described below. This test method was published in 1996 and revised in 2010, the contents of which are incorporated herein in their entirety. For the references ASTM standards, visit the ASTM website provided immediately above.

ASTM D 1921-12 is entitled "The Standard Test Method for Particle Size (Sieve Analysis) of Plastic Materials." The term "ASTM D 1921-12" as used herein refers to the standard test method for determining the particle size distribution of a material. The process typically separates fine particles from the more course particles by passing the material through a number of sieves of different mesh sizes. This allows the mass fraction of particles within each size range to be measured and cumulative distribution constructed. This test method was published in 1996 and revised in 2012, the contents of which are incorporated herein in their entirety.

ISO 60 is entitled "Plastics—Determination of apparent density of material that can be poured from a specified funnel." The term "ISO 60" as used herein refers to the standard test method for determining the apparent density of a molding powder or a granular material. The sample is poured through a specified funnel into a measuring cylinder of 100 cubic centimeter capacity, the excess is removed with a straightedge and the mass of the contents is determined by weighing the resulting sample. This test method was published in 1976 and revised in 1977, the contents of which are incorporated herein by reference in their entirety. For the referenced ISO standards, visit the ISO website, www.iso.org.

ISO 37 is entitled "Rubber, vulcanized or thermoplastic—Determination of tensile stress-strain properties". The term "ISO 37" as used herein refers to the standard test method for determining the tensile strength and elongation of a TPE material when measured using a Type 1 Die Specimen and a test rate of 500 mm/min. This test method was revised in 2011, the contents of which are incorporated herein by reference in their entirety. For the referenced ISO standards, visit the ISO website, www.iso.org.

ASTM D412 is entitled "Standard Test Methods for Vulcanized Rubber and Thermoplastic Elastomers—Tension". The term "ASTM D412" as used herein refers to the standard test method for determining the tensile strength and elongation of a TPE material when measured using a Type C Die Specimen and a test rate of 500 mm/min. This test method was revised in 2016, the contents of which are incorporated herein by reference in their entirety. For the reference ASTM standards, visit the ASTM website, www.astm.org.

The term "Tg" as used herein refers to the glass transition temperature of the TPE material which is the temperature that the material exhibits a transition from a glassy material to a rubbery material. Tg as referred to herein is measured as the peak temperature of the tangent delta curve (ratio of storage modulus to loss modulus) when measured by Dynamic Mechanical Analysis at a frequency between 1 to 11 Hertz and a temperature ramp rate of 2 degrees Celsius per minute.

Disclosed herein are methods for the formation of a thermoplastic material, also referred to herein as the skin layer, having enhanced adhesive performance. In an aspect, the thermoplastic material suitable for use in the present disclosure is a thermoplastic elastomer (TPE) further comprising an adhesive promoting agent (APA). Herein an APA refers to a substance that increases the force with which the TPE adheres to a substrate to which it is applied. In an aspect, the APA may include a diethanol amine amide (DEAA) and/or a silane type compound. In particular, the silane type compound may be an organo-silane compound such as, but not limited to, aminoethylaminopropylmethyldimethoxysilane.

In an aspect, the composition disclosed herein may include a mixture of DEAA and TPE. The addition of DEAA to a TPE material to form a skin layer increases the adhesion of the TPE skin layer to an underlying foam such that the failure mode changes from adhesive failure when DEAA is not present to cohesive failure in the presence of DEAA. The pull force required to separate the TPE skin layer and the foam correlates to the percent cohesive failure as described below. The foam, or foam layer, or foam surface, as used herein, refers to a cellular type material that may include open cells and/or closed cell type structure. The DEAA may be of the general formula:

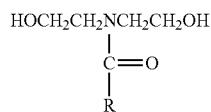

where R is a hydrocarbyl group, an alkyl group, an alkene group or combinations thereof. The term "hydrocarbyl group" is used herein in accordance with the definition specified by IUPAC: a univalent group formed by removing a hydrogen atom from a hydrocarbon. In an aspect, R is an unsaturated hydrocarbyl group where "unsaturated" refers to the presence of alkene type structures such as —CH═CH—. The hydrocarbon chain therefore can have 6 to 18 carbon atoms. Accordingly, R may have the structure —$(CH_2)_5CH_3$ up to —$(CH_2)_{17}CH_3$ including isometric variations.

TPEs of the present disclosure may include, but not limited to, a thermoplastic polyolefin formulation (TPE-O), styrenic block copolymer formulation (TPE-S), polyester or copolyester formulation (TPE-E), thermoplastic vulcanizate (TPE-V), or polyurethane (TPE-U) or a mixture of one or more thermoplastic elastomer formulations. In an aspect, the TPE-S may include, but is not limited to, styrene-butadiene copolymers (SBC), styrene-ethylene-butadiene styrene copolymers (SEBS), or mixtures thereof. Such materials typically indicate glass transition temperatures (Tg) that are below room temperature (25° C.) and which are capable of at least 50% elongation, alternatively 100% elongation as measured according to ISO 37, and having a tensile strength in the range of at least 4 MPa, alternatively in the range of from 4 MPa to 20 MPa, alternatively of from 4 MPa to 15 MPa, alternatively in the range of from 4 MPa to 8 MPa, preferably in the range of from 4 MPa to 6 MPa, as measured according to ASTM D412. In an aspect, the TPE materials disclosed herein have a tensile strength in the range of at least 580 psi, alternatively in the range of from 580 psi to 2900 psi, alternatively in the range of from 580 psi to 1170 psi, preferably in the range of from 580 psi to 2176 psi, and most preferably in the range of from 580 psi to 880 psi.

In an aspect, TPE-O may include polypropylene, polyethylene, polyalphaolefins and copolymers thereof and/or mixtures thereof. In another aspect, TPE-O may also include mixtures of polyolefin, polyolefin copolymers, uncrosslinked EPDM rubber, and/or styrenic block copolymers.

In an aspect, TPE-V may include polypropylene and EPDM rubber where the EPDM rubber is cross-linked, or dynamically vulcanized wherein due to the presence of heat and/or shearing, and optionally in the presence of a cross-linking promoter, cross-linking is developed during the compounding step.

In an aspect, the TPE-S may include styrenic block copolymer, selectively hydrogenated styrenic block copolymer, polyolefin and/or processing oil. In an aspect, the styrenic block copolymer or the selectively hydrogenated styrenic block copolymer is an organic polymer containing mono alkenyl arene end blocks (A) and a midblock (B) of a polymerized diene monomer or a polymerized mono alkenyl arene and a polymerized conjugated diene in which the mono alkenyl arene and conjugated diene are arranged in a controlled distribution. The description of the styrenic block copolymers and selectively hydrogenated styrenic block copolymers may be found in U.S. Publication No. 2012/0070665 and U.S. Pat. No. 7,169,848. In an aspect, the polyolefin may be polypropylene, polyethylene, poly-1-butene or polymethylpentene, and any copolymers thereof and/or mixtures thereof. In an aspect, the processing oils may include, but are not limited to, paraffinic oil or other petroleum derived oils, vegetable and animal oil and their derivatives, naphthenic oil, and the like.

In an aspect, the TPE-S is a selectively hydrogenated block copolymer having the general configuration A-B-A, (A-B)n, (A-B-A)n, (A-B-A)nX, (A-B)nX or mixtures thereof, where n is an integer from 2 to about 30, alternatively 2 to about 15 or alternatively 2 to 6 and X is coupling agent residue. In an aspect, the selectively hydrogenated styrenic block copolymer may have a total polystyrene content greater than 10 wt. %. The selectively hydrogenated block copolymer may be carried out via any of the suitable selective hydrogenation processes known in the art. For example, selective hydrogenation may be accomplished using methods such as those described in, for example, U.S. Pat. Nos. 3,670,054 and 3,700,633. In an aspect, selective hydrogenation may be carried out under such conditions such that at least 90%, preferably at least 95%, and more preferably at least 98% of the conjugated diene double bonds have been reduced, and between 0% and 10% of the arene double bonds have been reduced.

In an aspect, a composition of the type disclosed herein is prepared by contacting an APA with a TPE material where the TPE material is present in an amount in the range of greater than or equal to 90 wt. %, preferably greater than or equal to 95 wt. %, and where the APA is present in the range of 0.5 wt. % to 10.0 wt. %, alternatively in the range of 0.5 to 5.0 wt. % based upon the total weight of composition.

In an aspect, the TPE material may optionally include additional additives such as scratch resistance improving agents, agents to modify the surface feel, grip and/or frictional characteristics, thermal stabilizers, antioxidants, UV stabilizers, hindered amine light stabilizers, fillers, and/or pigments.

In an aspect, the TPE and the APA are combined to form a mixture which is subsequently extruded to form pellet material. In another alternative aspect, the TPE is formed into a pellet material and subsequently mixed with an APA. In yet another aspect, the TPE is formed into a pellet material with or without an APA and then cryo-ground into a powder which is then combined with one or more APAs. In an aspect, extruded pellets (e.g., TPE and APA or TPE alone) have a diameter of from 2 mm to 3 mm and a bulk density in the range of from 20.0 lbs/ft³ to 30.0, alternatively from 24.0 lbs/ft³ to 26.0 lbs/ft³ as measured in accordance with ISO 60. In an aspect of the present disclosure, the extruded pellets may be subsequently cryo-ground (cooling and reducing particle size) to an average particle size distribution, also referred to as D50 (particle size distribution median), of from 200 µm to 1600 µm, alternatively from 200 µm to 500 µm or alternatively from 200 µm to 300 µm, where the average particle size distribution is measured according to ASTM D 1921-12.

In an aspect, the cryo-ground powder also referred to herein as powder or powder material, may then be dusted with a partitioning agent to provide suitable solid state powder flow and deblocking behavior. Suitable partitioning agents may include without limitation zinc oxide, boron nitride, calcium carbonate, silica, talc, aluminum oxide, silicon carbide, magnesium stearate, calcium stearate, milled polyolefin powders or mixtures thereof. The partitioning agent may be applied in an amount of less than or equal to 5.0% by weight based on the total weight of the pellet or powder material, alternatively less than 3.0% by weight or alternatively less than 2.0% by weight. The partitioning agent may therefore be present in the range of 0.1% by weight up to 5.0% by weight. The powder so produced containing said partitioning agent may be characterized by a funnel flow of from 20 seconds to 50 seconds, alternatively from 25 seconds to 40 seconds or alternatively from 25.0 to 35.0 seconds as measured by ASTM D1895-03. Funnel flow serves as a characterization of the handling properties of a finely divided plastic material. Particularly it is a measure of the readiness with which such materials will flow through hoppers and feed tubes and deliver uniform weights of material.

In an aspect, the method disclosed herein may further comprise combining, along with the DEAA, a silane type compound, alternatively, an organo-silane compound, also referred to herein as an organo-silane, containing amino functionality (—$NH_2$ or —NH— groups) having a molecular weight (MW) of less than or equal to 1000 g/mol, or alternatively, a MW of less than or equal to about 500 g/mol, to further improve the adhesion of the foam layer to a TPE skin layer. Reference to organo-silane compound may be understood as a compound containing carbon-silicon bonds and wherein the silicon may also be bonded to alkyl ether functionality, such as —OR, where R is a hydrocarbyl group, an alkyl group, an alkene group or combinations thereof. Preferably, R has up to 6 carbon atoms, such as —$OCH_3$ or —$O(CH_2)_nCH3$ wherein n is any integer from 1 to 5, including isometric variations. In addition, the MW of the silane may be in the range of from 50 g/mol to 300 g/mol or alternatively in the range of from 150 g/mol to 250 g/mol.

In an aspect, the silane compound may also be included in a composition comprising a TPE and DEAA in an amount ranging from about 0.05 wt. % to about 5.0 wt. %. More specifically, the method may further comprise combining a TPE/DEAA mixture with aminoethylaminopropylmethyl-dimethoxysilane ($C_8H_{22}N_2O_2Si$), having the following structure:

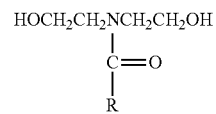

In an aspect, the present disclosure further provides an article prepared from the mixture of a TPE and an APA, both of the type disclosed herein. For example, the mixture may be melted to form a skin, a skin layer or a TPE skin or a TPE layer or a TPE skin layer. The process used to melt and form the TPE into said skin includes slush or rotational molding process, and is contemplated to include injection molding, extrusion, or calendaring. The fuse temperature for the slush or rotational molding process may be between 220 and 240° C.

For example, the materials disclosed herein are used in a process for the preparation of a skinned composite material used, for example, in the manufacture of vehicle components. The process may comprise taking a mixture formed from a TPE and an APA to a mold where the mold is heated to, and kept at, a first temperature of from about 180° C. to 240° C. during the fusion and gelling of the mixture, such that the mixture applied adheres by fusion to the mold.

In an aspect, the TPE skin may alternatively be flame treated to produce a flame treated TPE skin. The term "flame treated" as used herein refers to the flaming of the skin surface with an oxygen/natural gas blend. In an aspect, the flame may be a hydrocarbon based flame such as propane, and the like. The luminous zone of the flame front which may be at a temperature in the range of 1700-1900° C. is passed over the surface of the TPE skin for a period in the range of 5-15 sec seconds. This is then followed by forming a foam against a surface of the flame treated TPE skin.

In an aspect, the foam may be a polyurethane foam, also referred to herein as the polyurethane foam layer. The polyurethane foam layer may be produced by curing a polyurethane reaction mixture which includes: (a) one or more polyether polyols or polyester polyols containing end groups that are reactive with isocyanates, such as —OH groups; (b) one or more polyisocyanates and the like; and/or (c) at least one blowing agent. The polyurethane so formed may be crosslinked by incorporation of a trifunctional reagent, such as a trifunctional polyisocyanate, or by increasing the index, which is the number of isocyanate groups relative to the number of isocyanate reactive groups (e.g., —OH groups). In an aspect, additional suitable cross-linking agents may include, but are not limited to, hydroxyl or amine type compounds that include a hydroxyl or amine functionality of greater than 2.

In an aspect, a method is disclosed herein for forming a skinned composite that comprises placing a polyurethane-foaming reaction mixture against a TPE skin layer, where the skin layer contains 0.5-5.0% by weight of diethanolamine-amide (DEAA) of the following structure:

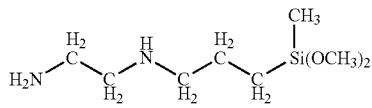

wherein R is a saturated or unsaturated hydrocarbon chain containing between 6 to 18 carbons, a hydrocarbyl group, an alkyl group, an alkene group or combinations thereof. The polyurethane-foaming reaction mixture is allowed to fully polymerize and undergo crosslinking if desired and expand to form a foam structure where the foam then adheres to the skin to provide a polyurethane-skin bond. The polyurethane foam as described herein may have a thickness in the range of from 3.0 mm to 10.0 mm, preferably from 3.0 mm to 8.0 mm and a density in the range of from 7.0 pcf to 13.0 pcf, preferably from 8.0 pcf-11.0 pcf. The attached TPE skin layer alternatively may have a thickness in the range of from 0.5 mm to 1.5 mm, preferably from 0.7 to 1.5 mm, and more preferably from 0.9 mm to 1.2 mm. The polyurethane-skin (or foam-skin) bond indicates cohesive type failure upon application of a pull force to the skin layer.

Figure 2:
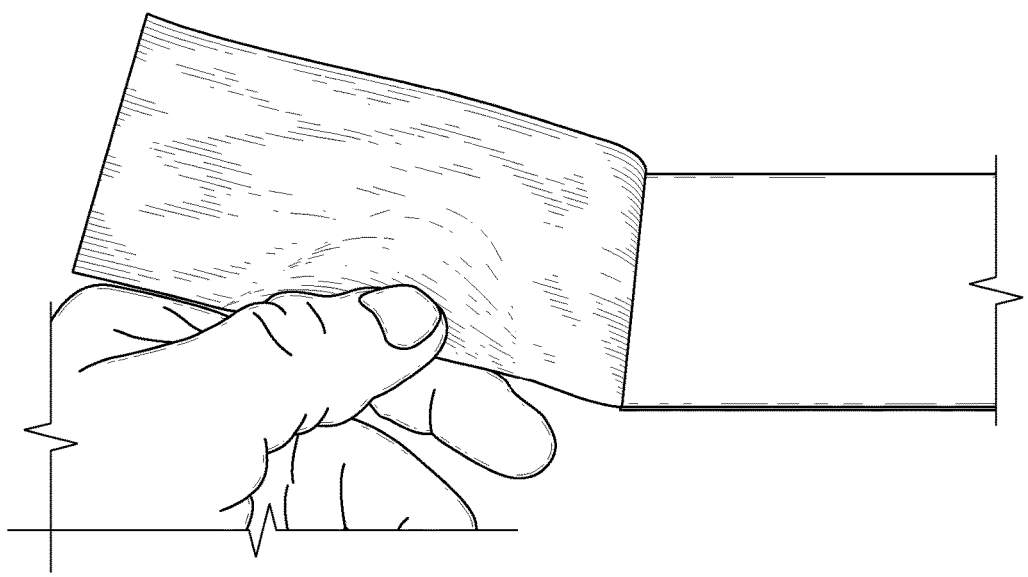
FIG. 2 shows an example of adhesive failure.

The adhesion between the said foam and the TPE skin may be evaluated by measuring the pull force required for the removal of the skin from the foam, and visually observing whether an adhesive or a cohesive type failure has occurred. In an aspect, the TPE skin is a flame treated TPE skin. The skinned composite comprising the TPE skin and the polyurethane foam, is evaluated for adhesion and cohesive failure between the skin and the foam. Cohesive failure is assessed by visual observation of the skin surface that was in contact with the foam after removing the skin from the foam. Cohesive failure is rated when the skin surface has the visual appearance as shown in FIG. 1 where a layer of foam remains attached to a skin layer surface indicating a break in foam the foam layer, and not in the foam-skin bond. By contrast, TPE skin that does not include an APA, and in particular that does not include DEAA and/or does not include DEAA in combination with a silane type compound, demonstrates adhesive type failure indicating a failure in the foam-skin bond as shown in FIG. 2 where the TPE skin is substantially free of any foam residue. Accordingly, for an area of skin attached to the polymer forming the foam, the use of the APA herein is such that the polymer forming the foam and skin layer indicate at least 50%, preferably at least 90%, more preferably 90-100% cohesive failure, and more preferably 100% cohesive failure. It is useful to note that when there are voids at the foam-skin interface, there will be no transfer of the polymer forming the foam and therefore would not be relevant to determining the presence of adhesive of cohesive failure. FIG. 1 shows cohesive failure whereas FIG. 2 shows 0% cohesive failure.

The pull force for the cohesive failure of greater than 50% may fall in the range of 10.0 Newtons to 25.0 Newtons, preferably 15.0 Newtons to 25.0 Newtons as measured using a Chatillon Force Gauge to pull a 2.0-inch skin sample from the foam at uncontrolled rate where the maximum load is determined. Such pull force may vary up to 55%. For example, for an observed pull force of 18 Newtons, the variation may be ±8 Newtons, or 44.4%. As noted, cohesive type failure as used herein refers to the observation of a residue of foam on the skin layer as it is removed.

In an aspect, the addition of a silane type compound to the TPE/DEAA mixture during the preparation of the skin layer significantly reduces variability in the pull force. The pull force for cohesive failure of at least 50%, alternatively for cohesive failure of at least 90%, or alternatively for cohesive failure of 100%, may fall in the range of 175 Newtons/meter to 250 Newtons/meter, as measured according to ASTM D6862 on a 2.0-inch skin sample using an Instron Tensile Tester at the rate of 300 mm/sec and a 90 degree peel angle. The combination of DEAA and an organo-silane compound, the pull force is relatively consistent and may vary by not more than 2.0%. For example, if the pull force is measured to be 230 Newtons/meter, such pull force may vary +/−3 Newtons/meter (1.3%). Accordingly, the desired variability in the pull force may be in the range of less than 10%, preferably less than 5%.

In an aspect, the skinned composite disclosed herein includes a foam layer, preferably a polyurethane foam layer, and a TPE skin layer bonded to the polyurethane foam layer, wherein the TPE skin layer contains: (a) 0.5-5.0% by weight of APA, alternatively DEAA as described herein; or alternatively (b) a mixture of DEAA at 0.5-5.0% by weight in combination with 0.05-5.0% by weight of an organo-silane compound containing amino functionality (—$H_2$ or —NH— groups) having a molecular weight of less than or equal to 1000 g/mol, preferably less than 500 g/mol.

The foam-skin composite as described herein may have particular utility in a number of vehicle type applications, and in particular, interior automotive trim applications. This may include instrument panels and consoles, airbag deployment doors, vehicular door components, headliner and overhead systems, and even flooring systems.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1. Preparation of Skinned Composites

TPE skins were produced by combining the TPE material formulations with DEAA to produce DEAA/TPE mixtures, where DEAA was present at a level of 2.0% by weight. The mixtures were then used in powder box molding and resulted in the formation of TPE skin layers. The TPE skin layers had a thickness in the range of 0.5 mm to 2.5 mm. The force required to remove the TPE skin layers from the nickel surface of the casting box tooling was in the range of 2.0 to 4.7 Newtons as measured using the Chatillon Force Gauge as described above. The casting time for the TPE skin layers ranged from 6.0 to 14.0 seconds. The time for fusion of the TPE skin layers ranged from 1.0 to 2.0 minutes.

The TPE skin layers were then flame treated by flaming the at least one of the TPE skin layer surfaces with an oxygen/natural gas blend. Similarly, the luminous zone of the flame front which was at a temperature in the range of 1700-1900° C. was passed over one of the surfaces of the TPE skin layers for a period in the range of 5-15 sec seconds. This was then followed by forming a polyurethane foam layer onto the flame treated surface of each of the flame treated TPE skin layers.

The polyurethane foam layer was formed by curing a polyurethane reaction mixture which included: (a) one or more polyether polyols or polyester polyols containing end groups that are reactive with isocyanates, such as —OH groups; (b) one or more polyisocyanates; (c) at least one blowing agent. The polyurethane was crosslinked by incorporation of a trifunctional reagent, such as a trifunctional polyisocyanate, or by increasing the index, which is the number of isocyanate groups relative to the number of isocyanate reactive groups (e.g., —OH groups). The polyurethane foam layer had a thickness in the range of 3.0 mm-8.0 mm and a density in the range of 8.0 pcf-11.0 pcf. The attached TPE skin layers alternatively had a thickness in the range of 0.9 mm-1.2 mm.

The pull force for removal of the TPE skin layers was then evaluated using Chatillon Force Gauge on a 2-inch sample. It is noted that in the case of the TPE resins that contained the DEAA, the pull force to remove the TPE skin layer from the foam was 19.6 Newtons, and the failure mode was 100% cohesive type failure. By contrast, the TPE skin layers that did not include the DEAA additive indicated an adhesive type failure, or <100% cohesive type failure, with a pull force of less than 5.0 Newtons.

Example 2. Preparation of Skinned Composites

A cryo-ground TPE powder having a particle size distribution of D50 of 200 μm to 300 μm was combined with DEAA as described above. The TPE/DEAA mixture was then combined with the aminoethylaminopropylmethyldimethoxysilane by mixing the mixture in a ribbon blender. Such ribbon blended mixture was then combined with an amount of a suitable partitioning agent. The final product, a powder mixture, contained the following ingredients at the indicated weight percents: 96.0 wt. % of TPE, 2.0 wt. % of DEAA, 0.1 wt. % of aminoethylaminopropylmethyldimethoxysilane and 1.9 wt. % of the partitioning agent. The powder mixture was then slush molded into skins and foamed in place to provide polyurethane foam adhered to the TPE skins. Evaluation of the adhesion characteristics indicated a pull force for at least 50% cohesive failure to remove the skin in the range of 175 Newtons/meter to 250 Newtons/meter, where the pull force was measured according to ASTM D 6862 utilizing an Instron Tensile Tester to pull a 2.0 inch sample from the foam at the rate of 300 mm/sec, where the force was reported in Newtons/meter.

Although the compositions presented herein and their advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of the ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for forming a thermoplastic elastomer (TPE)-skinned composite comprising the steps of:
    a) forming a skin layer having at least one surface comprising:
        (i) a thermoplastic elastomer; and
        (ii) an adhesive promoting agent;
    b) providing a foam layer forming mixture on the at least one surface of the skin layer; and
    c) forming a foam layer on the at least one surface of the skin layer to form the TPE-skinned composite.

2. The method of claim 1, wherein the skin layer comprises the adhesive promoting agent in an amount of 0.5 wt. % to 10 wt. % based upon the total weight of the skin layer.

3. The method of claim 1, wherein the skin layer comprises the thermoplastic elastomer in an amount of equal to or greater than 90 wt. % based upon the total weight of the skin layer.

4. The method of claim 1 wherein the adhesive promoting agent is a diethanol amine amide (DEAA) having the following structure:

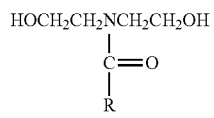

wherein R is a hydrocarbon chain, saturated or unsaturated, containing 6-18 carbon atoms.

5. The method of claim 1, wherein the skin layer has a thickness of 0.5 mm to 2.5 mm.

6. The method of claim 4, wherein the adhesive promoting agent further comprises an organo-silane compound.

7. The method of claim 4, wherein the DEAA is present in the range of 0.5 wt. % to 5.0 wt. % based upon the total weight of the skin layer.

8. The method of claim 6, wherein the organo-silane compound is present in the range of from 0.05 wt. % to 5.0 wt. % based upon the total weight of the skin layer.

9. The method of claim 6, wherein the organo-silane compound contains one or more carbon-silicon bonds and wherein the organo-silane compound has a molecular weight of less than or equal to 1000 g/mol.

10. The method of claim 6, wherein the organo-silane compound has the following structure:

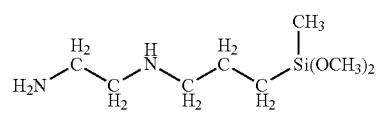

11. The method of claim 1, wherein the thermoplastic elastomer has at least one glass transition temperature below 25° C., has an elongation of at least 50% as measured according to ISO 37, and has a tensile strength of at least 4 MPa as measured according to ASTM D412.

12. The method of claim 1, further including at least one of the following:
    the thermoplastic elastomer and the adhesive promoting agent are mixed and extruded to form pellets prior to forming the skin layer; or
    the thermoplastic elastomer is extruded and formed into pellets and then combined with the adhesive promoting agent prior to forming the skin layer.

13. The method of claim 12, wherein the pellets are cryo-ground to form a cryo-ground powder having a particle size distribution average of 200 μm to 1600 μm.

14. The method of claim 13, wherein the cryo-ground powder is combined with an organo-silane compound to form a silane-coated powder.

15. The method of claim 12, wherein the pellets have a diameter of 2.0 to 3.0 mm and a bulk density of 20.0 lbs/ft$^3$ to 30.0 lbs/ft$^3$.

16. The method of claim 1, wherein the thermoplastic elastomer is selected from a group consisting of a thermoplastic polyolefin formulation (TPE-O), a styrenic block copolymer formulation (TPE-S), a polyester or copolyester formulation (TPE-E), a thermoplastic vulcanizate (TPE-V), or a polyurethane formulation (TPE-U) or a mixture of one or more thermoplastic elastomer formulations.

17. The method of claim 1, wherein the foam layer has a thickness in the range of 3.0 mm to 8.0 mm.

18. The method of claim 1, wherein step a) further comprises treating the skin layer by flaming the at least one surface to produce a flame treated skin layer.

19. The method of claim 1, wherein the skin layer and the foam layer form a foam-skin bond wherein the foam-skin bond demonstrates a cohesive failure of at least 50% and wherein the pull force for the cohesive failure is in the range of 175 Newtons/meter to 250 Newtons/meter measured according to ASTM D 6862.

20. A method for forming a thermoplastic elastomer (TPE)-skinned composite comprising the steps of:
    a) forming a skin layer having at least one surface comprising:
        (i) a thermoplastic elastomer wherein the thermoplastic elastomer has at least one glass transition temperature below 25° C., has an elongation of at least 50% as measured according to ISO 37, and has a tensile strength of at least 4 MPa as measured according to ASTM D412; and (ii) an adhesive promoting agent wherein said adhesive promoting agent comprises diethanol amine amide (DEAA) having the following structure:

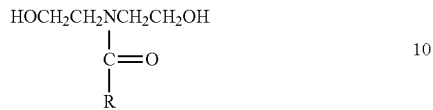

wherein R is a hydrocarbon chain, saturated or unsaturated, containing 6-18 carbon atoms wherein DEAA is present at a level of 0.5 wt. % to 5.0 wt. % based upon the total weight of the skin layer;

b) providing a foam layer forming mixture on the at least one surface of the skin layer;

c) forming a foam layer on the at least one surface of the skin layer to form the TPE-skinned composite.

* * * * *